United States Patent [19]
Brower et al.

[11] 3,816,192
[45] June 11, 1974

[54] A PROCESS FOR PREPARING LITHIUM ALUMINUM HYDRIDE-ALUMINUM HYDRIDE COMPLEXES

[75] Inventors: Frank M. Brower, Midland; Arthur L. Daniels, Colman, both of Mich.; George S. Fujioka, Walnut Creek, Calif.

[73] Assignee: The Dow Chemical Company, Midland, Mich.

[22] Filed: Dec. 12, 1960

[21] Appl. No.: 75,439

[52] U.S. Cl. ............................... 149/109, 423/644
[51] Int. Cl. ............................................. C01b 1/00
[58] Field of Search .................... 52/.5; 23/14, 204; 149/109; 423/644

[56] References Cited
UNITED STATES PATENTS

| | | | |
|---|---|---|---|
| 2,461,663 | 2/1949 | Schlesinger | 23/14 |
| 2,567,972 | 9/1951 | Schlesinger | 23/14 |
| 2,680,059 | 6/1954 | Bragdon | 23/14 |
| 2,720,444 | 10/1955 | Banus et al. | 23/14 |
| 2,740,702 | 4/1956 | Mace | 52/.5 |
| 2,857,258 | 10/1958 | Thomas | 52/.5 |
| 2,867,498 | 1/1959 | Roscoe | 23/14 |
| 2,913,306 | 11/1959 | Schechter | 23/14 |

OTHER PUBLICATIONS

Refs. cited for Factual Showing Finholt et al., J. Am. Chem. Soc., Vol. 69, pp. 1,199–1,209.
Hurd, Chemistry of the Hydrides, John Wiley, 1952.

Primary Examiner—Benjamin R. Padgett
Assistant Examiner—R. L. Tate
Attorney, Agent, or Firm—C. Kenneth Bjork

[57] ABSTRACT

A complex of $LiAlH_4$ and $AlH_3$ is prepared by mixing substantially anhydrous ether solution of $AlCl_3$ and $LiAlH_4$ in a dry inert atmosphere. By-product LiCl is removed and the complex hydride is subsequently recovered.

3 Claims, No Drawings

A PROCESS FOR PREPARING LITHIUM ALUMINUM HYDRIDE-ALUMINUM HYDRIDE COMPLEXES

This invention relates to complex light metal hydrides and more particularly is concerned with new and novel complexes of $LiAlH_4$ and $AlH_3$.

The existence of both the individual compounds, lithium aluminum hydride ($LiAlH_4$) and polymeric aluminum hydride and the use of these as high energy fuels are known. Of these two materials, aluminum hydride is conceded to be the superior fuel, but the aluminum hydride as prepared in ether solution normally exists only in a highly ether solvated form. This ether of solvation greatly reduces the actual fuel values from that normally expected from aluminum hydride and thereby reduces its usefulness.

Now, unexpectedly it has been found that the new and novel compositions of the instant invention provide a fuel superior to either non-solvated $LiAlH_4$ or solvated polymeric aluminum hydride $(AlH_3)_x$ or mixtures of these.

It is a principal object of the present invention to provide as a high energy fuel certain complexes of lithium aluminum hydride and aluminum hydride.

It is a further object of the present invention to provide complexes of $LiAH_4$ and $AlH_3$ which, as desired, may or may not be solvated with solvent of preparation.

It is an additional object of the present invention to provide a series of associated complexes of $LiAlH_4$ and $AlH_3$ which are varied in component proportions.

It is still another object of the present invention to provide new and novel hydride compositions which are strong reducing agents and thereby have potential use as selective reducing agents in organic reactions.

These and other objects and advantages of the instant compositions will be apparent from the detailed description presented hereinafter.

The new and novel hydrides of the instant invention comprise complexes of lithium aluminum hydride and aluminum hydride wherein the amount of $LiAlH_4$ varies from about 0.2 up to about 4 moles per mole of the $AlH_3$. Of particular importance are those complexes of $LiAlH_4$ and $AlH_3$ containing a molar excess of $LiAlH_4$ equivalent to at least 1.5 moles per mole of $AlH_3$ (e.g. $3LiAlH_4 \cdot 2AlH_3$) as these complexes are essentially completely desolvated. Complexes having a $LiAlH_4$ and $AlH_3$ ratio less than 1.5/1 are partially solvated although not to as great an extent as a mixture of $LiAlH_4$ and solvated aluminum hydride.

In preparing the instant novel lithium aluminum hydride-aluminum hydride complexes, separate anhydrous ether solutions of aluminum chloride and lithium aluminum hydride are mixed in a dry, inert atmosphere. Following the mixing, the lithium chloride which forms is allowed to settle to the bottom of the reaction vessel and the supernatant solution is then added to a large excess of an aromatic organic solvent. Use of this second solvent aids to remove further undesirable impurities from the product solution as well as promotes formation of the nonetherated complex hydride. Alternatively, the reaction can be run directly in a solvent mixture of the ether and the aromatic member. The solvent is then removed from the hydride product thereby yielding the white, fluffy solid lithium aluminum hydride-aluminum hydride complex.

In carrying out the instant preparation, the ratio of starting components can vary from at least about 0.2 mole up to about 10 moles or more $LiAlH_4$ per mole of aluminum chloride. The amount of ether solvent used is critical. If this alone is used for the reaction medium and solutions of starting material much more concentrated than 1 molar in the ether are used, during reaction the complex hydride product begins to precipitate along with the lithium chloride byproduct. However, use of a large excess of an aromatic hydrocarbon second solvent member, for example, benzene, toluene, xylene and the like to provide a solvent pair delays greatly the undesired premature precipitation of the product during the reaction.

The amount of the aromatic diluent to be used with a given amount of an ether hydride solution, either when used in the direct preparation or subsequent purification must be of sufficient quantity that the resulting solution contains at least 50 percent by volume of the aromatic members. Preferably, the solution will contain more than 70 percent of the aromatic member. In any event, the preparation of the complexes proceeds rapidly as the reaction ordinarily is complete within a few minutes.

The maximum reaction temperature is limited by the temperature of decomposition of the complexes. The preparation of these complexes will be carried out therefore at a maximum temperature of about 80° C., and preferably at temperatures below 60° C. The lower temperature limit is the freezing or solidification point of the solvent (e.g. with a solvent mixture of ether and a large excess of benzene the operable lower temperature of reaction will be from about 0° to about 5° C.)

The solid purified complex metal hydride can be recovered from the ether-aromatic solution, after removal of the solid inorganic contaminant therefrom, by conventional evaporation or crystallizing techniques. Particularly effective recovery is obtained by simply removing the solvent mixture, e.g. as by vacuum stripping. Alternatively, the lower boiling ether member can be fractionally distilled from the substantially solid impurity free solution whereupon precipitation of the purified hydride is obtained in the aromatic member. With controlled distillation rates, the amount of solid hydride which is recovered from solution can be limited. This, in turn, further controls purity. As the percentage of hydride recovery increases, the degree of product purity decreases. Additionally, the product so obtained can be further subjected to high vacuum devolatilization.

Since these products undergo spontaneous decomposition upon exposure to the atmosphere, the preparation and storage of these complex hydrides will be carried out in a substantially anhydrous inert atmosphere of nitrogen, argon, helium, and the like.

The complex hydride products themselves as formed are all white or off-white fluffy solids which decompose without melting upon heating from about 80° to about 100° C.

These materials are particularly useful as fuels in a propellant composition when used with an oxidizer, as for example, a combination of $(LiAH_4)_3 \cdot (AlH_3)_2$ and $NH_4ClO_4$.

Depending on the type of performance desired from a given propellant system, the combination of the complex hydride fuel and oxidizer can be made to be fuel rich, stoichiometrically balanced or oxidizer rich.

The following examples will serve to further illustrate the present invention but are not meant to limit it thereto.

EXAMPLE 1

Twenty-five milliliters of a 1.003 molar anhydrous diethyl ether solution of aluminum chloride and about 192 milliliters of a second ether solution of 1.17 molar lithium aluminum hydride were measured, inside of a nitrogen-filled dry box, into separate vessels. These vessels were so designed that they could be removed from the dry box and their contents transferred to a reaction flask while still maintained under a dry nitrogen atmosphere. After removal of the vessels from the dry box, the two solutions were mixed in the reaction vessel. The reactants were then agitated by a magnetic stirrer for about four minutes, after which time the stirrer was stopped. The lithium chloride formed during the reaction was allowed to settle to the bottom of the reaction flask. The supernatant solution was then decanted under a nitrogen blanket into a large flask containing about 2,500 milliliters of anhydrous, thiophene-free benzene which was being magnetically stirred. The resulting dilute solution contained a small amount of suspended solids consisting primarily of lithium chloride plus a small amount of the complex hydride product. This solution was filtered through a medium porosity sintered glass frit over a period of 30 minutes. The bulk of the solvent was then removed from the complex hydride containing filtrate by flash vacuum distillation at from about 25° to about 55° C. over a period of about 4 hours. The reaction flask (still blanketed with nitrogen) was placed in the nitrogen-filled dry box and the white, fluffy solid lithium aluminum hydride-aluminum hydride complex was transferred to a smaller vacuum flask. This flask and contents were removed from the dry box and connected to a vacuum line evacuated with a mercury diffusion pump. After 18 hours of such vacuum treatment at room temperature, 6.35 grams of a white, solid product remained.

Analyses of this product showed C, 1.2 percent; H, 9.18 percent; Al, 77.8 percent; Cl, 0.9 percent and Li, 11.2 percent.

This analysis is indicative of a product having a purity of 97.4 percent of the expected material, $(LiAlH_4)_3 \cdot (AlH_3)_2$. The impurities are assumed to be 1.1 percent LiCl (based on the chloride analysis) and 1.8 percent ether (based on carbon analysis).

A benzene-ether solution of the $(LiAlH_4)_3 \cdot (AlH_3)_2$ was prepared and the complex was found to remain in solution even upon standing for prolonged periods of time. By contrast, a benzene-ether solution containing free aluminum hydride was found after a short period to contain precipitated solvated polymeric $(AlH_3)_x$.

EXAMPLE 2

Using the same preparative technique as in Example 1, a number of lithium aluminum hydride-aluminum hydride complexes containing varying numbers of $LiAlH_4$ and $AlH_3$ molecules were prepared. Additionally, some of those of low $LiAlH_4/AlH_3$ ratios were found to have varying molecules of ether complexed therewith.

Table 1, which follows, tabulates the ratio of starting components and molecular structure of the resulting complex hydrides which were prepared. The products all were white solids which were spontaneously decomposable in normal atmospheres. All of these products upon heating even in an inert atmosphere decomposed below 80° C. without melting.

TABLE I

| Run No. | Starting Materials (Moles) | | | Ratio Moles | Product Composition |
|---|---|---|---|---|---|
| | $LiAlH_4$ | $AlH_3$ | Diethyl Ether | $LiAlH_4/AlH_3$ | |
| 1 | 1 | 3 | 40 | .33 | $LiAlH_4 \cdot (AlH_3)_3 \cdot (C_2H_5OC_2H_5)_{0.4}$ |
| 2 | 1 | 2 | 30 | .50 | $LiAlH_4 \cdot (AlH_3)_2 \cdot (C_2H_5OC_2H_5)_{0.23}$ |
| 3 | 1 | 1 | 20 | 1.0 | $LiAlH_4 \cdot AlH_3 \cdot (C_2H_5OC_2H_5)_{0.09}$ |
| 4 | 2.5 | 1 | 35 | 2.5 | $(LiAlH_4)_5 \cdot (AlH_3)_2$ |
| 5 | 4 | 1 | 50 | 4 | $(LiAlH_4)_4 \cdot AlH_3$ |

Various modifications can be made in the instant invention without departing from the spirit or scope thereof for it is understood that we limit ourselves only as defined in the appended claims.

We claim:

1. A process for preparing lithium aluminum hydride aluminum hydride complexes which comprises mixing substantially anhydrous ether solutions of aluminum chloride and lithium aluminum hydride in a substantially dry, inert atmosphere, the ratio of lithium aluminum hydride to aluminum chloride reactants in said solutions ranging from about 0.2 to about 10 on a mole basis, removing the resulting precipitated lithium chloride from the reaction mixture solution, adding the reaction mixture solution to an aromatic liquid hydrocarbon miscible therewith, the amount of said aromatic liquid hydrocarbon being such that the resulting ether-aromatic hydrocarbon solution contains at least 50 per cent by volume of the aromatic member, and recovering a solid purified complex lithium aluminum hydride-aluminum hydride from the ether-aromatic solution of said lithium aluminum hydride-aluminum hydride complex.

2. The process as defined in claim 1 and including the step of recovering the solid purified complex lithium aluminum hydride-aluminum hydride by vacuum stripping the solvent mixture from the product reaction solution.

3. The process as defined in claim 1 wherein the ether member is diethyl ether and the aromatic hydrocarbon is benzene.

* * * * *